Dec. 30, 1941.    E. H. HAUX    2,268,251
BUILDING TILE CONTAINING CELLULAR GLASS
Filed May 20, 1938

INVENTOR.
ELMER H. HAUX
BY Bradley & Bee
ATTORNEYS.

Patented Dec. 30, 1941

2,268,251

UNITED STATES PATENT OFFICE 2,268,251

BUILDING TILE CONTAINING CELLULAR GLASS

Elmer H. Haux, Tarentum, Pa., assignor to Pittsburgh Plate Glass Company, Allegheny County, Pa., a corporation Application May 20, 1938, Serial No. 209,090

1 Claim. (Cl. 72—37)

The present invention relates to building units and more particularly to a unit comprising a clay shell filled with cellular vitreous material or glass.

The primary object of my invention is to improve the insulating value and strength of hollow clay tile by filling such tile with cellular glass.

Another object of my invention is to provide for the manufacture of hollow clay tiles with cellular glass cores expanded therein to form composite integral blocks.

Other objects and advantages of my invention will become more readily apparent from consideration of the following detailed description in conjunction with the accompanying drawing, wherein.

In practicing my invention, clay tile 10 may be produced in any convenient manner as, for example, by extruding or pressing suitably prepared material. The tile may then be fired to vitrify the clay at a temperature of approximately 1600° F. to 2100° F. or, if desired, the tile may be vitrified in the same firing operation in which cellular glass-forming material is expanded to fill the tile, as will be hereinafter described. The clay tile may suitably have the following approximate composition:

| | Per cent by weight |
|---|---|
| SiO$_2$ | 59.78 |
| Al$_2$O$_3$ | 24.02 |
| Fe$_2$O$_3$ | 2.52 |
| TiO$_2$ | 1.31 |
| CaO | .21 |
| MgO | .42 |
| Alkalies | 3.84 |
| Volatile constituents | 8.41 |

The tile 10 may be of any desired form depending upon the type of extruding die used in the forming operation. Cellular glass-forming material is then placed in the tile, such material being preferably compressed or in briquette form. A briquette of cellular glass-forming material 11 may be formed by mixing together powdered glass and about .25 per cent to 2.5 per cent, by weight, of a suitable gasifying agent, such as calcium carbonate, using about 6 per cent, by weight, of a solution of sodium silicate as a binding agent therefor and molding to form the desired shape of briquette. The briquette may also be formed by placing the above-mentioned ingredients, without a binder, in a suitable mold and heating it for a short period of time to a temperature of about 1200° F.

Figure 1:
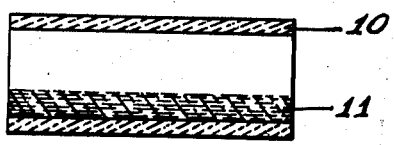
Figure 1 is a longitudinal sectional view of a tile partially filled with cellular glass-forming material.
Figure 3:
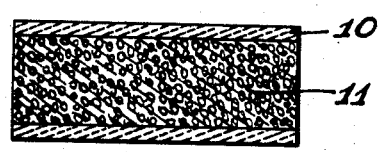
Figure 3 is a longitudinal sectional view of a tile which is completely filled with cellular glass.
Figure 2:
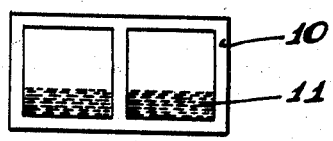
Figure 2 is an end view of a tile partially filled with cellular glass-forming material.
Figure 4:
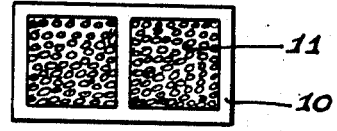
Figure 4 is an end view of a tile which is completely filled with cellular glass.

The briquette 11 is then placed in each hollow tile 10, as shown in Figures 1 and 2, so that the tile is initially filled about ½ to ⅓ full of cellular glass-forming material. The ends or sides of the tile 10 may be covered by plates preferably coated with sand, or they may be left uncovered. The assembled tile are then placed in a suitable burning kiln and fired to a temperature of approximately 1600° F. to 1750° F. The cellular glass-forming ingredients will be softened and sintered, and the gasifying agent therein decomposed, thereby causing the briquette 11 to expand until it completely fills the tile 10, as shown in Figures 3 and 4.

When the ends of the tile are covered by plates, it will be impossible for the expanding cellular glass to escape. However, if the tile are stacked in a burning kiln without having the ends covered by plates, when heated sufficiently the briquette will expand, and the cellular glass will bulge out beyond the ends of the tile. These ends may be removed by any suitable means, such as by knives or saws.

Figure 5:
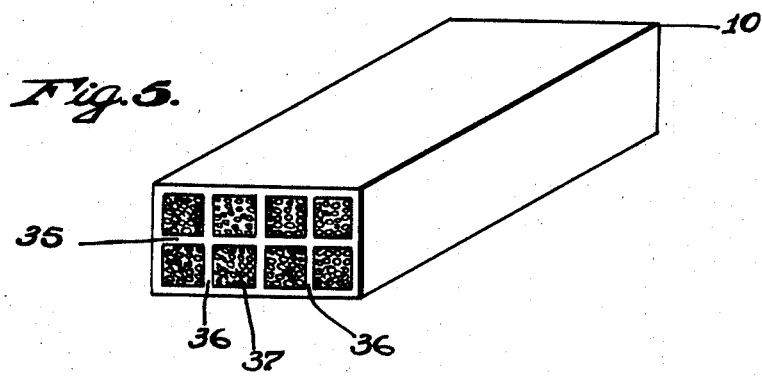
Figure 5 is an isometric view of a multiple-cored tile which may be produced in accordance with the present invention.

Referring to Figure 5 there is provided a multiple-cell tile 10 of rectangular form having a horizontally-extending partition 35 therethrough which divides the tile at its mid-section and a plurality of vertically-extending partitions 36 which intersect the horizontal partition 35 and divide the interior of the tile into a plurality of cells 37. The tile 10 may be prepared in the usual manner. The tile may then be treated by either of the processes described above, to vitrify the clay tile and to fill the cells 37 with cellular glass. It will be noted that the tile shown provides a direct path for heat flow through the webs or partitions 35 and 36.

Figure 6:
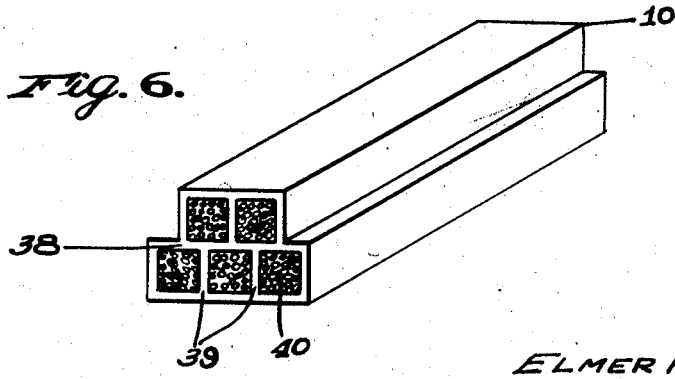
Figure 6 is a similar view of a modified form of tile which may be produced according to my invention.

Referring to Figure 6 which illustrates a multiple-cell tile 10, which is divided into five cells by a horizontally-extending centrally located partition 38 and by a plurality of vertically-extending partitions 39 that are offset or staggered with respect to each other to form the cells 40. The tile 10 may be prepared in the usual manner and treated by either of the processes described above, to vitrify the clay and to fill the cores 40 with cellular glass. It will be noted that this form of tile eliminates a direct path of heat flow through the webs or partitions 38 and 39 due to the staggered relation of the vertically-extending partitions 39. This construction is obviously advantageous for providing a superior heat-insulating tile for building purposes.

My improved building tile provides a unit which has high heat-insulating value and possesses inherent ability to impart unusual strength to a wall in which it may be embodied. Also, it provides for the formation of a superior mortar joint in building walls formed of such tile because the mortar will penetrate the open cells of the cellular glass cores to form an excellent interlocking means.

The foregoing detailed description has been given for clearness of understanding only and no limitations should be imposed upon the appended claim which should be construed as broadly as permissible in view of the prior art.

What I claim is:

A building block comprising a burnt clay shell and an expanded cellular glass body filling the inside of the shell and joined to the walls thereof and forming with the latter an integral composite unit.

ELMER H. HAUX.